US009600687B2

(12) United States Patent
Allen et al.

(10) Patent No.: US 9,600,687 B2
(45) Date of Patent: Mar. 21, 2017

(54) COGNITIVE DIGITAL SECURITY ASSISTANT UTILIZING SECURITY STATEMENTS TO CONTROL PERSONAL DATA ACCESS

(71) Applicant: International Business Machines Corporation, Armonk, NY (US)

(72) Inventors: Corville O. Allen, Morrisville, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 14/503,603

(22) Filed: Oct. 1, 2014

(65) Prior Publication Data

US 2016/0098576 A1    Apr. 7, 2016

(51) Int. Cl.
| G06F 21/00 | (2013.01) |
| G06F 21/62 | (2013.01) |
| G06Q 30/02 | (2012.01) |
| G06Q 20/38 | (2012.01) |
| G06F 21/34 | (2013.01) |

(52) U.S. Cl.
CPC ...... *G06F 21/6245* (2013.01); *G06F 21/6263* (2013.01); *G06Q 30/0207* (2013.01); *G06F 21/34* (2013.01); *G06F 2221/2117* (2013.01); *G06F 2221/2141* (2013.01); *G06Q 20/383* (2013.01)

(58) Field of Classification Search
CPC ...... G06F 21/60; G06F 21/6245; G06F 21/34; G06Q 10/10; G06Q 20/383

USPC .......................................................... 726/29
See application file for complete search history.

(56) References Cited

U.S. PATENT DOCUMENTS

| 6,581,059 | B1 * | 6/2003 | Barrett ............... G06F 21/6245 |
| 6,947,897 | B2 * | 9/2005 | Lortscher ........... G06F 21/6245 |
| | | | 705/1.1 |
| 7,630,986 | B1 * | 12/2009 | Herz .................... G06Q 10/10 |
| 8,229,819 | B2 | 7/2012 | Ransom et al. |
| 8,635,087 | B1 * | 1/2014 | Igoe ..................... G06Q 40/00 |
| | | | 705/2 |
| 9,338,152 | B2 * | 5/2016 | Etchegoyen ........... G06F 21/34 |

(Continued)

OTHER PUBLICATIONS

"Cognitive Security Analytics Company SparkCognition Launches With Support from Leading Investors," PRWeb, Apr. 15, 2014, 3 pages.

*Primary Examiner* — Hadi Armouche
*Assistant Examiner* — Bryan Wright
(74) *Attorney, Agent, or Firm* — VanLeeuwen & VanLeeuwen; Diana R. Gerhardt

(57) ABSTRACT

An approach is provided in which a cognitive digital security assistant intercepts a personal data request from a client that is requesting personal data from a user. The cognitive digital security assistant analyzes the personal data request against the user's security statements to determine whether to provide the user's personal data to the client. During the analysis, the cognitive digital security assistant determines whether the personal data request includes benefits that meet the user's benefit thresholds included in the user's security statements. When the benefits meet the user's benefit thresholds, the cognitive digital security assistant provides the requested personal data to the client in exchange for the benefit from the client.

18 Claims, 11 Drawing Sheets

(56) References Cited

U.S. PATENT DOCUMENTS

| | | | |
|---|---|---|---|
| 2001/0049620 A1* | 12/2001 | Blasko | G06Q 10/10 |
| | | | 705/14.53 |
| 2002/0072969 A1* | 6/2002 | Fisher | G06Q 10/06375 |
| | | | 705/14.66 |
| 2003/0233278 A1* | 12/2003 | Marshall | G06Q 30/00 |
| | | | 705/14.35 |
| 2004/0153521 A1* | 8/2004 | Kogo | A63F 13/12 |
| | | | 709/206 |
| 2009/0276825 A1* | 11/2009 | Hatakeyama | G06F 21/6245 |
| | | | 726/1 |
| 2013/0035982 A1 | 2/2013 | Zhang et al. | |
| 2013/0042302 A1 | 2/2013 | Chow et al. | |
| 2013/0231990 A1 | 9/2013 | Munjal et al. | |
| 2013/0238416 A1 | 9/2013 | Richard | |
| 2013/0282494 A1 | 10/2013 | Newlands et al. | |
| 2013/0332362 A1* | 12/2013 | Ciurea | G06Q 20/383 |
| | | | 705/44 |
| 2014/0070947 A1 | 3/2014 | Ionson | |
| 2014/0082740 A1* | 3/2014 | Knijnenburg | G06F 21/552 |
| | | | 726/26 |
| 2014/0143886 A1* | 5/2014 | Eversoll | G06F 21/60 |
| | | | 726/27 |
| 2014/0344015 A1* | 11/2014 | Puertolas-Montanes | G06Q 20/10 |
| | | | 705/7.29 |

* cited by examiner

600

| SECURITY STATEMENTS |
|---|
| Allow access to my location if I can get a retail discount of 20%. |
| Don't allow access to my contacts list to gaming sites. |
| Never allow access to any of my information to an application operated by company ABC. |
| Share my location to keep me safe from potential hazards and danger. |

*FIG. 6*

COGNITIVE DIGITAL SECURITY ASSISTANT UTILIZING SECURITY STATEMENTS TO CONTROL PERSONAL DATA ACCESS

BACKGROUND

Social media involves the social interaction among users that allow users to create, share or exchange information and ideas in virtual communities and networks. Social media typically uses highly interactive mobile and web-based technologies for users to converse and share information on a real-time basis and is in various client forms such as Internet forums, weblogs, social blogs, microblogging, wikis, social networks, podcasts, etc.

Social media clients, along with other types of clients, may request a user's personal information, such as a mobile weather application executing on a mobile device requesting a user's location to provide local weather data to the user. Many times, clients request personal data in an attempt to learn more about their users and their users' contacts. For example, a client may request personal information such as a user's age, hobbies, location, etc. Clients may also request sensitive personal information such as the user's income level, street address, names of family members, etc. Many times, clients may request personal data from a user but do not provide the user with a reason as to why the user should provide the personal data or what benefit the user receives from providing the personal data.

BRIEF SUMMARY

According to one embodiment of the present disclosure, an approach is provided in which a cognitive digital security assistant intercepts a personal data request from a client that is requesting personal data from a user. The cognitive digital security assistant analyzes the personal data request against the user's security statements to determine whether to provide the user's personal data to the client. During the analysis, the cognitive digital security assistant determines whether the personal data request includes benefits that meet the user's benefit thresholds included in the user's security statements. When the benefits meet the user's benefit thresholds, the cognitive digital security assistant provides the requested personal data to the client in exchange for the benefit from the client.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 6 is an exemplary diagram depicting security statements stored in a natural language;

DETAILED DESCRIPTION

Figure 1:
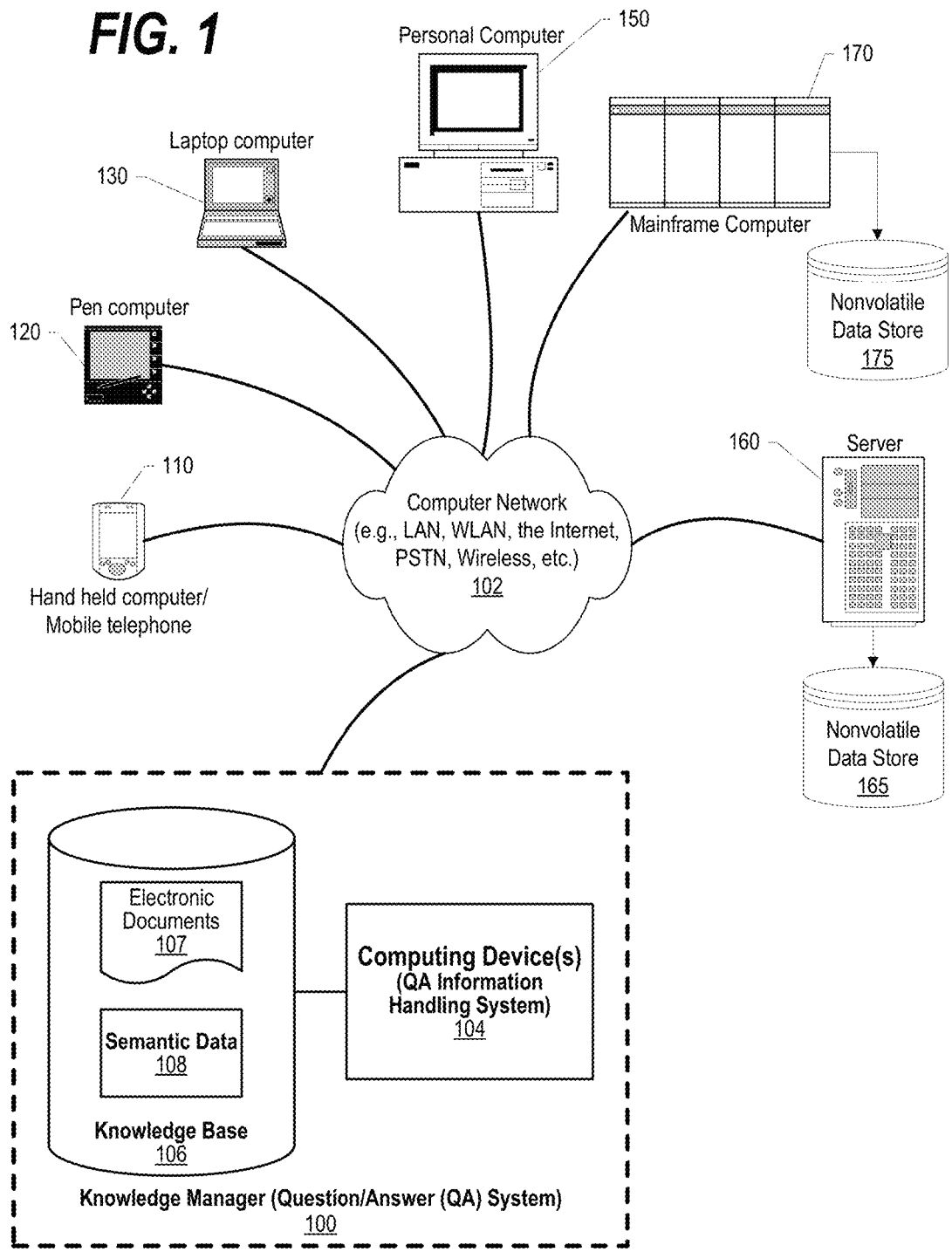
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
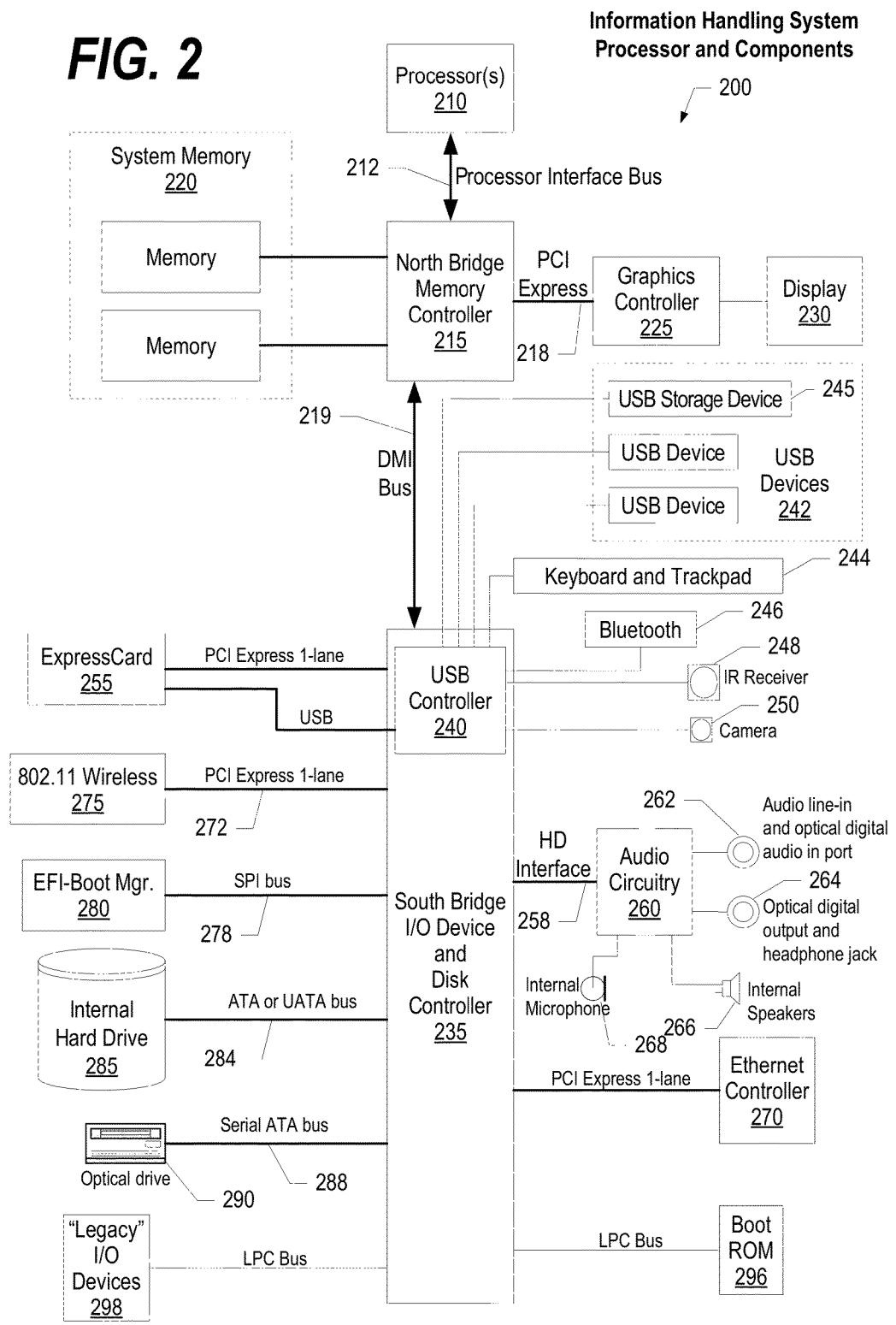
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system that generates security statements to provide personal data to clients based upon benefits from the client. In one embodiment, a cognitive digital security assistant generates security statements in response to monitoring user interaction with a client. In turn, the cognitive digital security assistant uses the security statements to manage personal data requests from other clients and provide personal data to the clients when the clients offer benefits that meet the user's benefit requirements. In another embodiment, the cognitive digital security assistant negotiates with a client on behalf of the user to obtain increased benefits to provide the personal data when the client does not initially offer a sufficient benefit. In yet another embodiment, the cognitive digital security assistant negotiates with the client to provide a reduced set of personal data based upon the client's initial benefit (see FIG. 11 and corresponding text for further details).

Figure 3:
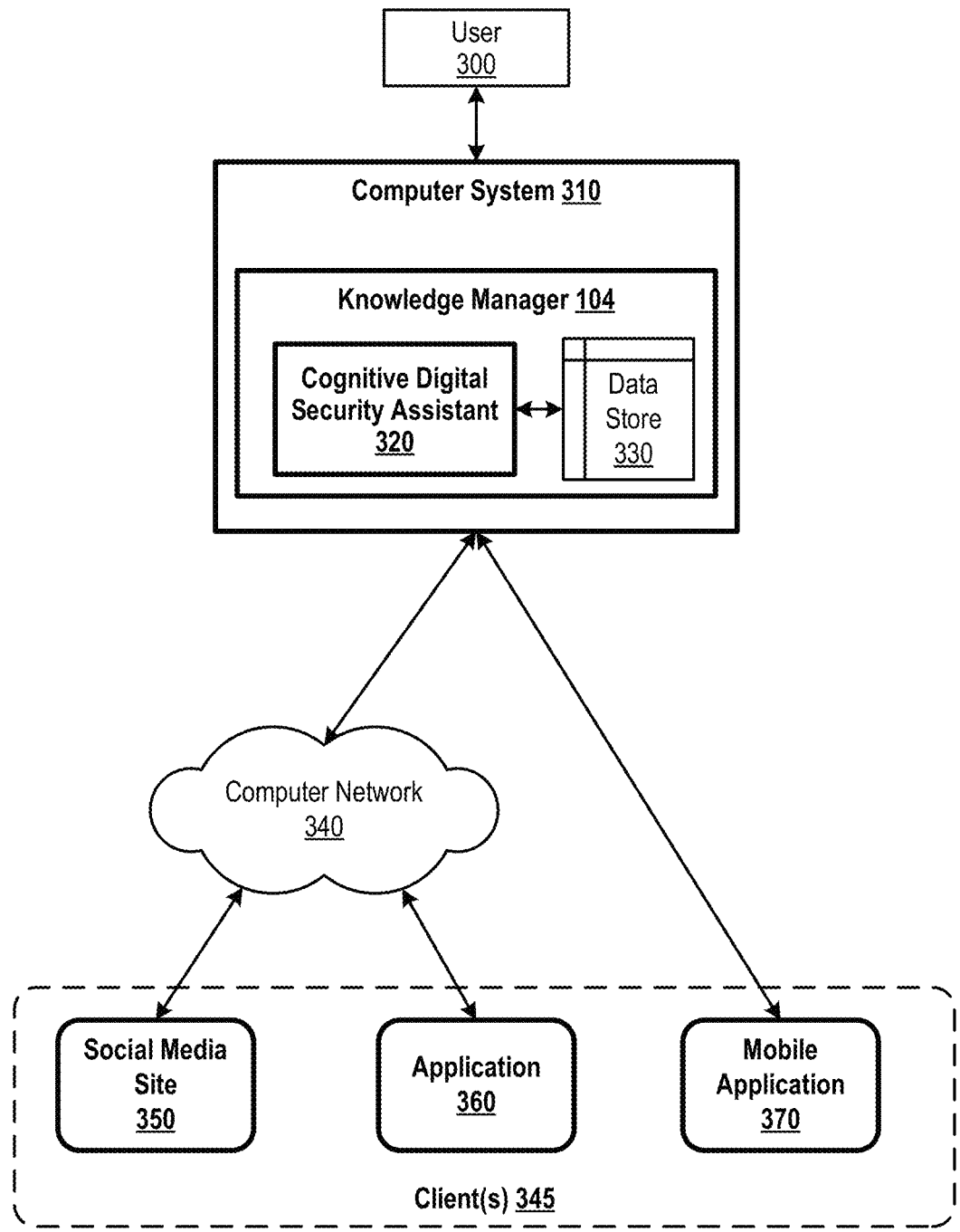
FIG. 3 is an exemplary diagram depicting a cognitive digital security assistant that intercepts personal data requests from clients and provides the personal data to the requesting clients when the client offers benefits that meet a user's benefit thresholds.

FIG. 3 is an exemplary diagram depicting a cognitive digital security assistant that intercepts personal data requests from clients and provides the personal data to the requesting clients when the client offers benefits that meet a user's benefit thresholds. Clients may be, for example, social media site 350, or software application 360 executing on a computer system, mobile application 370 executing on a user's mobile device, or any other mechanism that is capable of requesting a user's personal data. As discussed herein, a benefit may be any type of incentive offered to a user, such as requesting the user's location in exchange for merchandise discounts, connections to business partners, informing the user when friends are nearby, etc.

User 300 creates security statements on computer system 310 in a natural language that specifies personal information the user is willing to provide to a client if user 300 receives a particular benefit, or minimum benefit, from the client. In one embodiment, the security statements may originate from templates such as "I will give up X for Y discounts/games/ etc." In another embodiment, knowledge manager 104 with cognitive digital security assistant 320 automatically generate security statements based upon monitoring network behavior between user 300 and clients 345 to determine the user's willingness to provide personal data based upon benefits from clients 345. For example, social media site 350 may request user 300's age and user 300 provides the age after social media site 300 offers a 10% discount code for merchandise.

In one embodiment, cognitive digital security assistant 320 stores the security statements in a natural language context that specifies what personal information (data types) are allowed for what type of benefit by what types of entities (clients). Natural language context may be in the form of a sentence in a natural language that, in one embodiment, includes a statement about a type of data (e.g., location) and a type of benefit (e.g., reasonable discount) that the user will accept to share the data. In this embodiment, a learning model may associate an n-gram of (data, benefit, entity) and determine a user's response for a received personal data request.

When cognitive digital security assistant 320 receives a request for access of personal data, such as through computer network 340 or from a co-executing mobile application 370, cognitive digital security assistant 320 deduces the application/entity type and benefit, and then cognitive digital security assistant 320 identifies corresponding relationships from the security statements written in a natural language context for a user's secured data access.

When the security statements are established and stored in data store 330, cognitive digital security assistant 320 acts as a 'bodyguard' to user 300 against clients 345 based upon the stored security statements. When one of clients 345 initiate a request to obtain personal data from user 300, cognitive digital security assistant 320 intercepts the request and processes the request based upon the stored security statements in a manner transparent to user 300.

In one embodiment, cognitive digital security assistant 320 searches for security statements that correspond to the personal data requested by the client. For example, mobile application 370 may request user 300's date of birth and cognitive digital security assistant 320 locates security statements corresponding to the user's date of birth or age.

Cognitive digital security assistant 320 compares benefit thresholds in the corresponding security statements against benefits from the client to determine whether to provide the personal data to the client. Continuing with the example above, cognitive digital security assistant 320 may determine that a corresponding security statement specifies that user 300 must receive a 40% discount on local merchandise in order to provide the client with the user's date of birth. In this example, if mobile application 370 only offers a 10% discount on local merchandise, cognitive digital security assistant 320 denies mobile application 370's request.

In one embodiment, cognitive digital security assistant 320 sends a benefit increase proposal to a requesting client, which requests a benefit that matches the benefit threshold (e.g., 40% discount required). In another embodiment, cognitive digital security assistant 320 sends a personal data subset proposal to the client, which proposes sending a subset of the personal data based upon the benefit from the client (e.g., the age of user 300, see FIGS. 5, 9 and corresponding text for further details).

In turn, clients 345 do not burden user 300 with personal data requests. Instead, cognitive digital security assistant 320 manages the personal data requests and, in one embodiment, informs user 300 when user 300 receives benefits from clients 345 for providing personal data consistent with the user's security statements.

Figure 4:
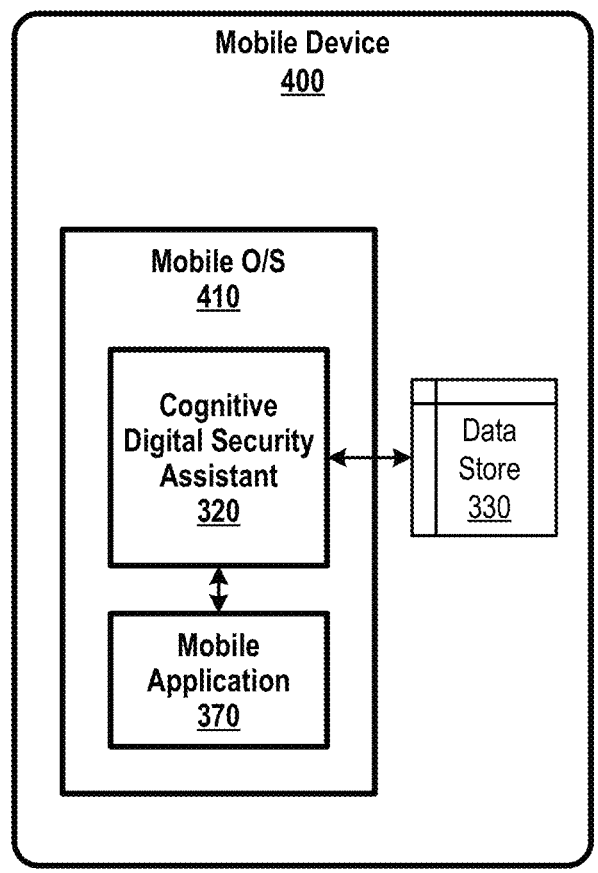
FIG. 4 is an exemplary diagram depicting an embodiment of a mobile device utilizing a cognitive digital security assistant to provide personal data to a mobile application based upon benefits offered to the user.

FIG. 4 is an exemplary diagram depicting a cognitive digital security assistant executing on a mobile device that receives personal data requests from a mobile application. Mobile device 400 may be a smart phone, laptop computer, tablet device, wearable device, or other type of mobile computing device that is capable of executing cognitive digital security assistant 320. Cognitive digital security assistant 320 executes on mobile operating system 410 and communicates with mobile application 370.

Mobile application 370 may be, for example, a software application that communicates with a particular web site over a mobile network. For example, mobile application 370 may be a restaurant recommendation app that communicates with a restaurant web site to provide a user with restaurant information. In this example, cognitive digital security assistant 320 receives a request from mobile application 370, such as requesting the user's location. In turn, cognitive digital security assistant 320 accesses data store 330 to analyzes security statements and determine whether to provide mobile application 370 with the location information. Cognitive digital security assistant 320 may identify security statements such as "Allow my location to provide restaurant recommendations" and, in turn, cognitive digital security assistant 320 provides mobile application 370 with the location information if mobile application 370 provides restaurant recommendations.

Figure 5:
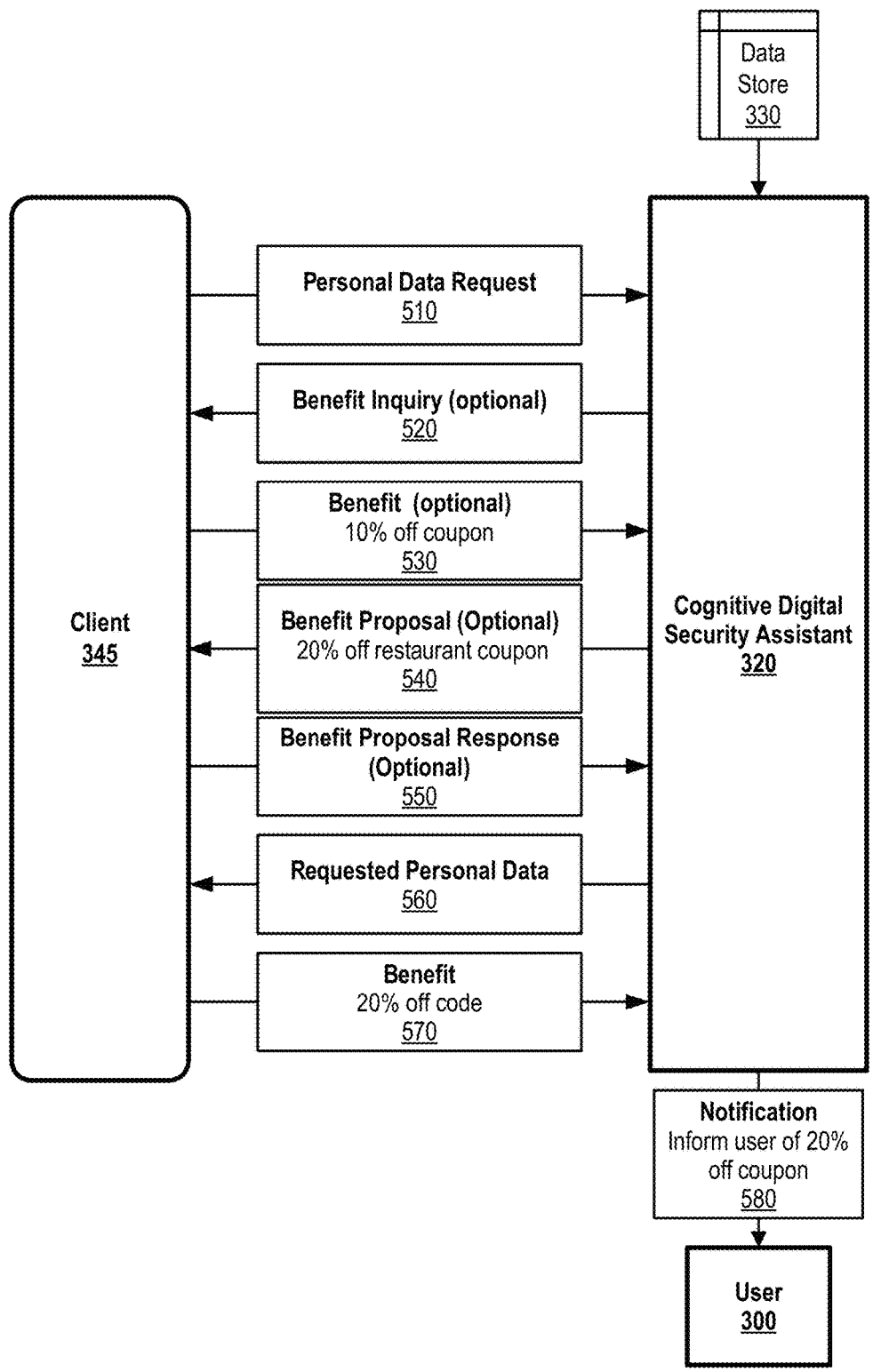
FIG. 5 is an exemplary diagram depicting a message session between a client and a cognitive digital security assistant.

FIG. 5 is an exemplary diagram depicting a message session between a client and a cognitive digital security assistant. Client 345 sends personal data request 510 to user 300. Cognitive digital security assistant 320 intercepts personal data request 510 and determines the type of personal data (e.g., user location) client 345 is requesting and corresponding benefits (e.g., merchandise discount). In one embodiment, if personal data request 510 does not include a benefit, cognitive digital security assistant 320 determines a benefit based upon the entity type of client 345. For example, if client 345 is a restaurant review application, processing may determine that the benefit is restaurant information, food information, dining coupons, etc. In one embodiment, cognitive digital security assistant 320 sends benefit inquiry 520 to client 345 to obtain specifics of benefits offered to user 300. Client 345 responds by sending benefit 530 that includes, in one example, a 10% off merchandise coupon.

Cognitive digital security assistant 320 evaluates the determined or provided benefit against security statements stored in data store 330 that correspond to the requested personal data (e.g., user location), and determines whether the benefit meets a benefit threshold that the corresponding security statements specify. When the benefit does not meet the benefit threshold, cognitive digital security assistant 320 sends, as an optional embodiment, benefit proposal 540 that includes a benefit increase proposal or a personal data subset proposal (see FIG. 11 and corresponding text for further details).

In this optional embodiment, client 345 sends benefit proposal response 550 to cognitive digital security assistant 320, which indicates whether client 345 accepts the benefit proposal. If benefit proposal response 550 indicates that client 345 accepted benefit proposal 540, or if cognitive digital security assistant 320 accepts initial benefit 530, cognitive digital security assistant 320 provides client 345 with the requested personal data 560 and client 345 provides benefit 570 to cognitive digital security assistant 320. In turn, cognitive digital security assistant 320 informs user 300 of benefit 570 via notification 580. In one embodiment, notification 580 identifies the personal data provided to client 345 in exchange for the benefit so user 300 may monitor negotiation outcomes of cognitive digital security assistant 320 based upon the security statements that are stored in data store 330.

FIG. 6 is an exemplary diagram depicting security statements stored in a natural language. Security statements 600 include statements that describe conditions for which a user is willing to share personal data. Cognitive digital security assistant 320 may generate security statements 600 based upon a user's manual input or from monitoring user interaction with a client. For example, cognitive digital security assistant 320 may monitor interaction between a user and a client and determine that the user does not provide any personal data to company "ABC." As such, cognitive digital security assistant 320 cognitively generates a security statement in a natural language context and stores the security statement in security statements 600.

In one embodiment, cognitive digital security assistant 320 employs a learning model that uses an n-gram of (data, benefit, entity) to determine a user's response. When cognitive digital security assistant 320 receives a request for access for personal data, cognitive digital security assistant 320 deduces an entity type and benefit type if not specified. Cognitive digital security assistant 320 pulls those relationships from the natural language context for a user's secured data access and answers with a "Yes" or "No" based on the trained system and the data with a confidence level to return the data. In this embodiment, the answer may include evidence that further restricts returned data to a subset of the requested data.

In another embodiment, security statements 600 may include a statement that overrides another statement. For example, security statements 600 may include a statement of "Provide location information to restaurant clients in exchange for a 10% discount" and "Do not provide personal information to clients associated with Restaurant ABC". In this example, if cognitive digital security assistant 320 receives a request from a restaurant client associated to Restaurant ABC, cognitive digital security assistant 320 does not provide location information regardless of the first security statement.

Figure 7:
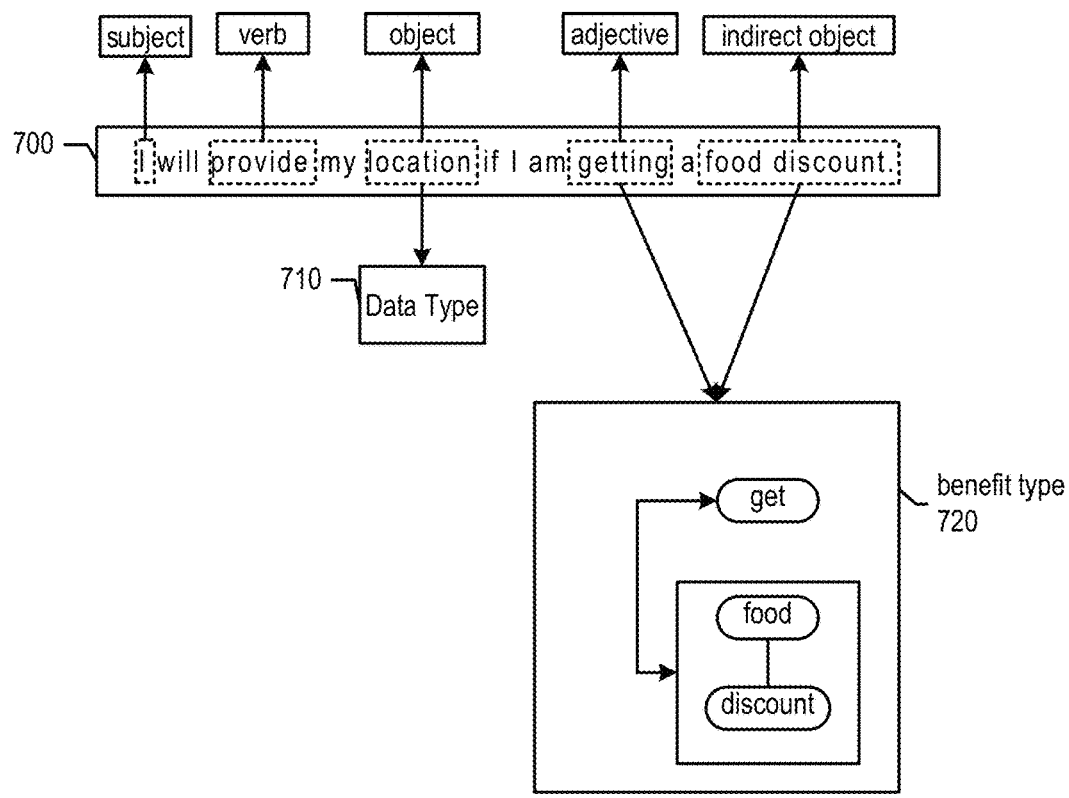
FIG. 7 is an exemplary diagram depicting an approach by a cognitive digital security assistant to perform cognitive analysis of a security statement written in a natural language context.

FIG. 7 is an exemplary diagram depicting an approach by a cognitive digital security assistant to perform cognitive analysis of a security statement written in a natural language context. In one embodiment, cognitive digital security assistant 320 uses English Slot Grammar (ESG) to parse security statement 700 into sentence parts of speech. Based on the parsed sentence parts in security statement 700, cognitive digital security assistant 320 builds several relationships of nouns, objects, etc. using verbs and indirect objects to determine security statement 700's data type 710 and benefit type 720. In one embodiment, cognitive digital security assistant 320 builds relationships in security statement 700 by mapping the verb "provide" to the term "location," which is data type 710 that cognitive digital security assistant 320 provides. As such, cognitive digital security assistant 320 uses a term mapping approach to associate "location" with "Known Places" by the user.

Regarding benefit type determination, cognitive digital security assistant 320 analyzes the relationship of the verb and adjective "getting" with the indirect object "food discount" associated in the same context to determine benefit type 720. In this embodiment, cognitive digital security assistant 320 treats the term that represents the indirect object "food discount" as the direct benefit, and the adjective and verb further defines and restricts the type of benefit. For example, the terms and relationships get-food-discount provide a tuple relationship that defines the benefit of a discount, restricted to food.

In another embodiment, cognitive digital security assistant 320 uses the analyzed information to train a learning model. In yet another embodiment, cognitive digital security assistant 320 uses a mapping approach with received requests to identify benefit types based on the requesting client (e.g., restaurant review client) and performs a cognitive scoring of the benefit terms and corresponding synonyms.

Figure 8:
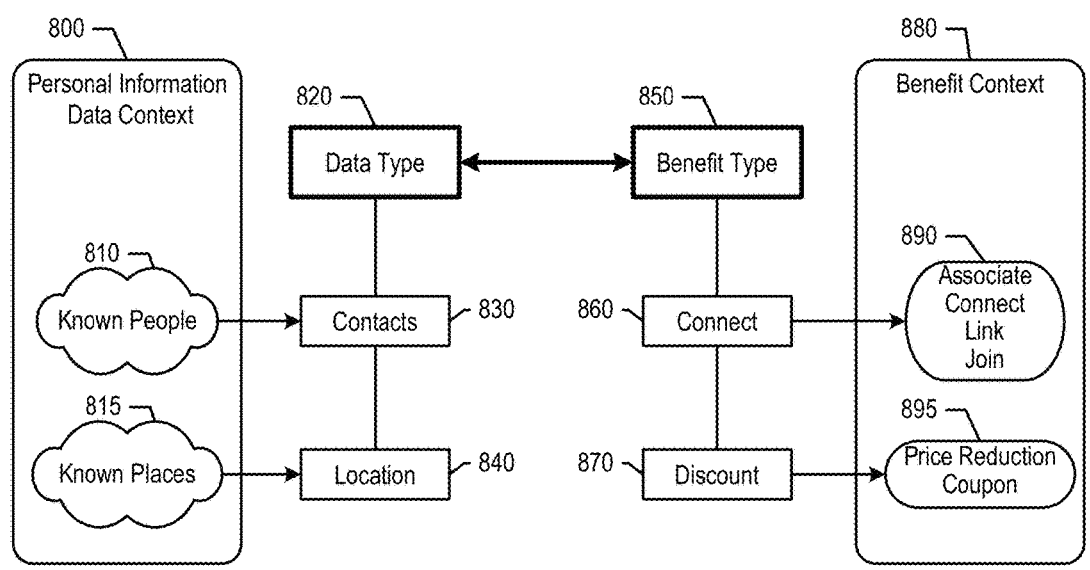
FIG. 8 is an exemplary diagram depicting associations of a security statement's data type context and benefit type context.

FIG. 8 is an exemplary diagram depicting associations of a security statement's data type context and benefit type context. Cognitive digital security assistant 320 deduces data types 720 and corresponding benefit types 750 from security statements written in a natural language context (see FIG. 7 and corresponding text for further details). Cognitive digital security assistant 320 further extrapolates data type terms and benefit type terms into concepts based on the ontology of personal information data context 800 and benefit context 880.

In one embodiment, cognitive digital security assistant 320 identifies synonyms of the data type terms and benefit type terms to encompass a larger context for the data context and benefit context, respectively. In this embodiment, cognitive digital security assistant 320 provides an improved cognitive and generalized approach to score a benefit or improve decision making techniques by encompassing a larger context. For example, cognitive digital security assistant 320 may determine that known people 810 corresponds to similar statements of "friends" and "acquaintances". In this example, contacts 830 encompasses a user's contact list and also the user's friends list, gaming partners list, etc. Likewise, with known places 815, location 840 may include a user's known places but may also include friends' known places.

Cognitive digital security assistant 320 identifies benefit types in a similar manner by performing a cognitive context match and scoring/weighting to decide whether to provide personal information to a requestor, which is different than using an explicit rule based approach or deterministic approach. For example, cognitive digital security assistant 320 generates a benefit relationship of "connect-friends" from the sentence "I will share my contacts to connect with friends," and uses a machine-learned benefit context to identify terms associated with "connect" that may include connect, associate, link, and join (890). As such, cognitive digital security assistant 320 weighs each term based on the usage in the corpora and the learned model, and attaches the benefit context and the weighting to the term. In turn, cognitive digital security assistant 320 uses the set of terms in the user's natural language statements to score an approval for the request. In one embodiment, cognitive digital security assistant 320 may discover the set of terms from a similarity, synonym and usage of corpora to determine a specific concept cloud of terms.

In one embodiment, when a client requests data, the requesting client identifies itself and cognitive digital security assistant 320 categorizes the requesting client with respect to benefit context 880, which cognitive digital security assistant 320 uses as a basis for determining whether to provide personal data. For example, when a restaurant review application requests contact information, cognitive digital security assistant 320 determines that the implicit or deduced benefit from the requesting application is restaurant information, food information, eating options, etc. (discount 870). As such, cognitive digital security assistant 320 may score the request based on how the deduced benefit and benefit context (895) match the set of security statements provided by the user as discussed above. For example, the user may have several statements to grant location access for food discounts, dining options, specialty restaurants, etc.

Figure 9:
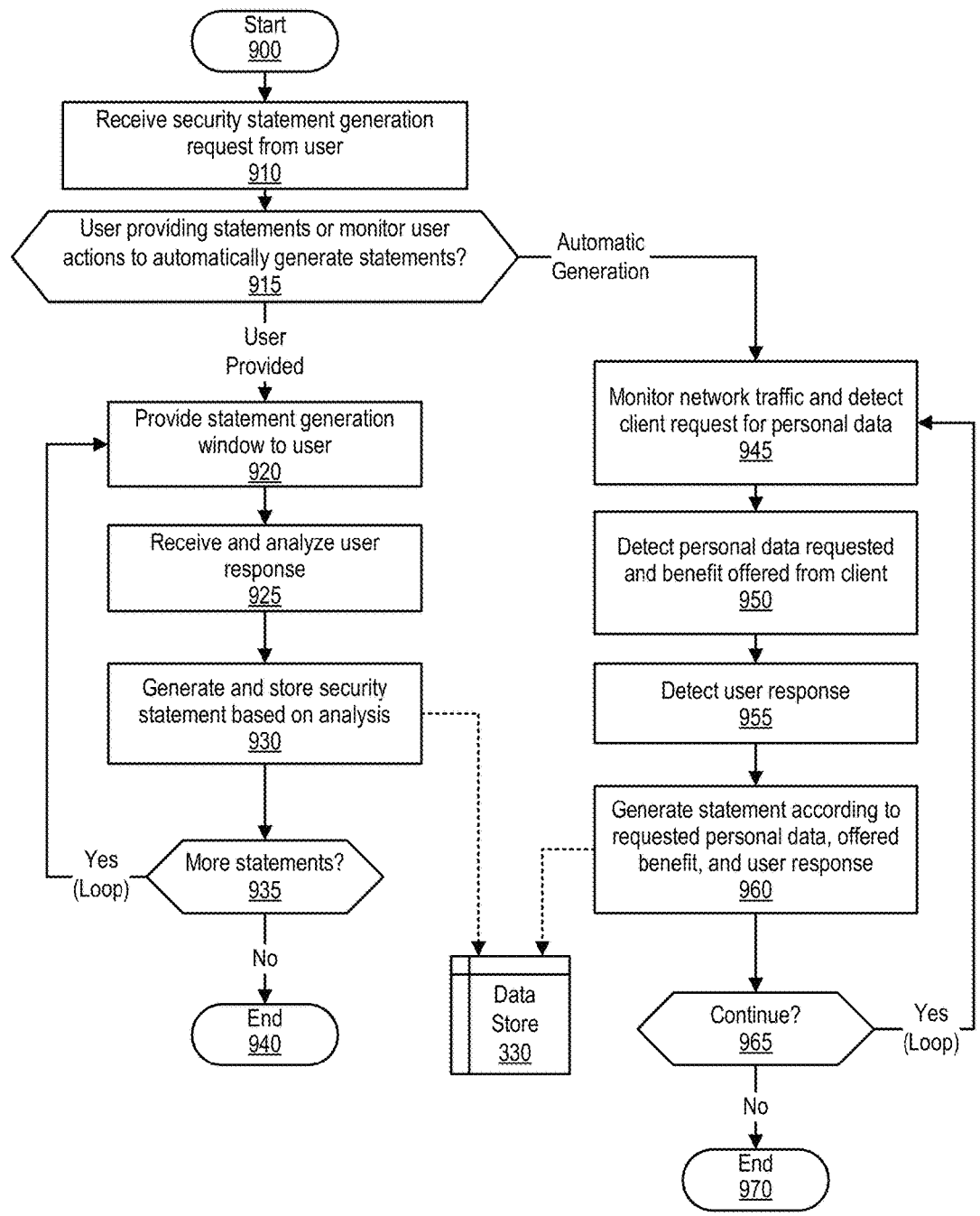
FIG. 9 is an exemplary flowchart depicting steps by a cognitive digital security assistant to generate security statements that specify benefit thresholds for providing personal data to a client.

FIG. 9 is an exemplary flowchart depicting steps by a cognitive digital security assistant to generate security statements that specify benefit thresholds for providing personal data to a client. As discussed earlier, a client may be, for example, a social media site, a software application executing on a computer system, a mobile application executing on a user's mobile device, or any other mechanism that is capable of requesting a user's personal data.

Processing commences at 900, whereupon the process receives a security statement generation request from a user at step 910. The process determines as to whether the user wishes to manually provide security statement information or whether the process should monitor user actions to automatically generate security statements (decision 915). For example, a user may interact with a client and request that the process monitor the user's interactions to generate corresponding security statements.

If the user wishes to manually provide security statement information, then decision 915 branches to the "user provided" branch. At step 920, the process provides a security statement generation window to the user, which allows the user to enter a security statement in a natural language such as those shown in FIG. 6. At step 925, the process receives the user response and analyzes the response to identify key attributes of the security statement. For example, if the user enters "Allow access to my location if I get a significant discount," the process, based on cognitive reasoning, determines that a significant discount for a retailer is 30% or more, and a significant discount at a restaurant is 10%.

At step 930, the process generates and stores a security statement in data store 330. In one embodiment, the process stores the security statement in a natural language such as that shown in FIG. 6. In another embodiment, the process stores key attributes of the security statement such as "location" and "20%." In yet another embodiment, the process compares the new security statement with existing security statement to check for conflict or replacement considerations. For example, the process may determine that a security statement exists that provides location data to a client if the user receives a discount of 10% and, in this example, the new security statement increases the required discount to 20%. In this example, the process may overwrite the existing security statement with a new security statement or the process may update fields that change (e.g., change 10% benefit threshold to 20% benefit threshold).

The process determines as to whether the user wishes to enter more security statements (decision 935). If the user wishes to enter more security statements, then decision 935 branches to the 'yes' branch which loops back to receive security statement information from the user and generate more security statements accordingly. This looping continues until the user is finished creating security statements, at which point, decision 935 branches to the "no" branch whereupon processing ends at 940.

Referring back to decision 915, if the user requests the cognitive digital security assistant to automatically generate security statements, then decision 915 branches to the "automatic generation" branch. At step 945, the process monitors network traffic and detects a client requesting personal data from the user, such as the user's location. In one embodiment, the process uses natural language processing to determine when a client requests personal data. For example, the process may detect keywords such as "location," "age," "contact information," etc.

At step 950, the process extracts the type of personal data requested by the client and benefits from the client. For example, the client may search for friends nearby if the user provides the user's location. At step 955, the process detects the user's response to the client's request, such as accepting the request, rejecting the request, sending a benefit increase proposal that requests a benefit increase, or sending a personal data subset proposal that proposes sending a subset of the requested personal data in exchange for the current benefit. For example, the user may offer to send the user's location to the client in exchange for locating friends nearby plus a 5% retail discount at local stores.

At step 960, the process generates a security statement based upon the interaction between the client and the user, and stores the security statement in data store 330. In one embodiment, the process stores the security statement in a natural language format in order for the user to review and understand the security statements, such as those shown in FIG. 6. In another embodiment, the process generates a security statement that includes key parameters such as "location," "locate nearby friend," and "5% discount."

The process determines as to whether continue monitoring network traffic and generating security statements (decision 965). If the process should continue, then decision 965 branches to the 'yes' branch, which loops back to monitor network traffic and generate more security statements accordingly. This looping continues until the process should stop generating security statements, at which point decision 965 branches to the 'no' branch whereupon processing ends at 970.

Figure 10:
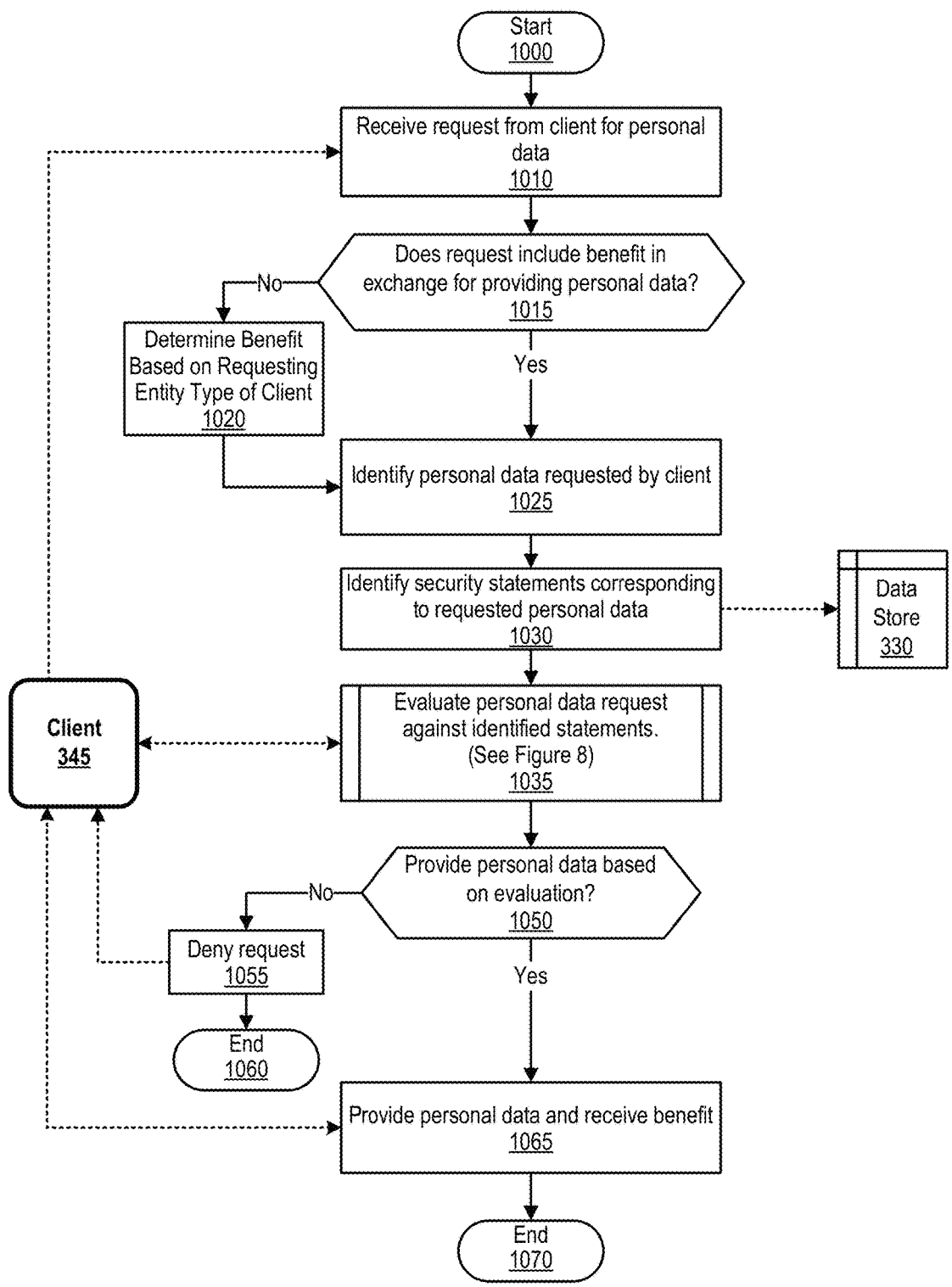
FIG. 10 is an exemplary flowchart depicting steps by a cognitive digital security assistant to process a client's request for personal data.

FIG. 10 is an exemplary flowchart depicting steps by a cognitive digital security assistant to process a client's request for personal data. Processing commences at 1000, whereupon the process intercepts a request from client 345 for personal data (step 1010). The process determines as to whether the request includes a benefit in exchange for providing personal data to the client, such as a retail discount (decision 1015). If the request includes a benefit in exchange for providing the personal data, then decision 1015 branches to the 'yes' branch.

On the other hand, if the request does not include a benefit, then decision 1015 branches to the 'no' branch whereupon processing determines a benefit based upon the entity type of client 345 at step 1020. For example, if client 345 is a restaurant review application, processing may determine that the benefit is restaurant information, food information, dining coupons, etc. In one embodiment, client 345 utilizes an unmodified API to request personal data. In this embodiment, client 345 provides identification either in metadata or as part of the request, but client 345 is not required to provide reasons for requesting the personal information. In turn, the process determines the benefit by determining the entity type of client 345 based upon client 345's identification.

In another embodiment, processing may query client 345 for specific benefit information when processing requires more details to determine whether to provide the personal information. For example, a travel client may request personal information and processing determines that a security statement allows sharing of personal information to travel clients if the travel client provides 15% off travel. In this example, processing may query client 345 for specific details of the benefit (see FIG. 5 and corresponding text for further details).

At step 1025, the process identifies the personal data requested by client 345 (e.g., location) and, at step 1030, the process locates security statements in data store 330 that correspond to the type of the requested personal data. For example, client 345 may request the user's location and the user's age in exchange for merchandise discounts within a five-mile radius of the user's location.

At predefined process 1035, the process evaluates the personal data request against the located security statements to determine whether to provide the personal data, or a subset of the personal data, to client 345 (see FIG. 9 and corresponding text for processing details). In one embodiment, the process may locate a rule that indicates never sending personal data to company "ABC," which may be considered a malicious web site. In this embodiment, the process may automatically reject client 345's request without regard to the benefit that client 345 offers.

The process determines as to whether provide personal data based on the evaluation from steps depicted in FIG. 9 (decision 1050). If processing should provide personal data, or a subset of the requested personal data, based on evaluation, then decision 1050 branches to the 'yes' branch whereupon, at step 1065, the process provides the personal data and receives the benefit. In one embodiment, the process also notifies user 300 of the received benefit, such as "You received a 10% discount." FIG. 10 processing thereafter ends at 1070. On the other hand, if processing should not provide personal data based on the evaluation from steps depicted in FIG. 9, then decision 1050 branches to the 'no' branch whereupon the process denies the personal data request from client 345 at step 1055. FIG. 10 processing thereafter ends at 1060.

Figure 11:
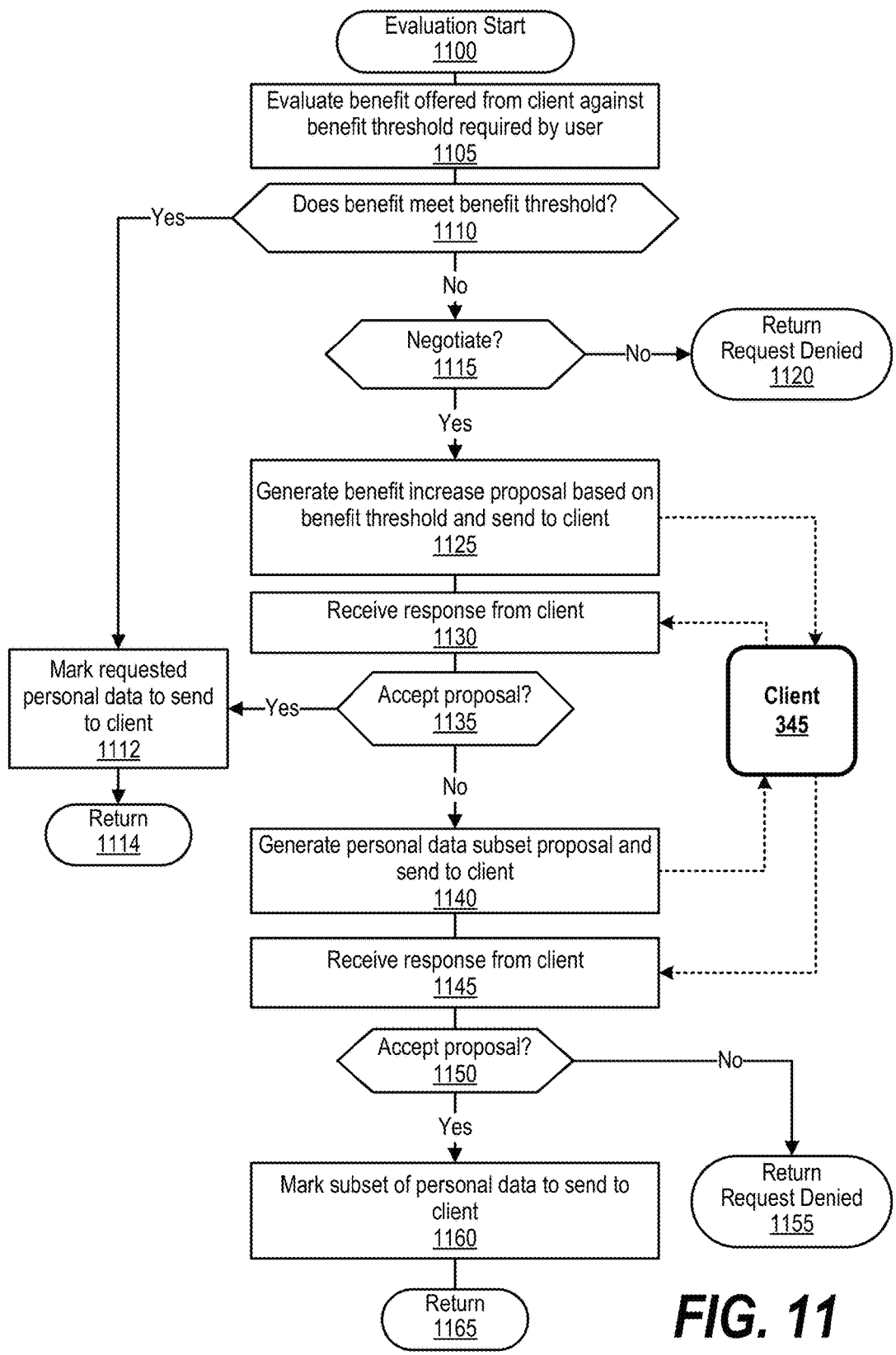
FIG. 11 is an exemplary flowchart depicting steps by a cognitive digital security assistant to evaluate benefits from a client against benefits required by a user to provide personal data.

FIG. 11 is an exemplary flowchart depicting steps by a cognitive digital security assistant to evaluate benefits offered by a client against benefits required by a user to provide personal data. Processing commences at 1100, whereupon the process evaluates the benefit from the client against the benefit threshold required by user that are included in the located security statements (step 1105). For example, the process may have identified a security statement that requires a 15% discount on local merchandise if the user provides the user's location to a client.

The process determines as to whether the benefit meets the benefit threshold (decision 1110). If benefit meets the benefit threshold, then decision 1110 branches to the 'yes' branch. At step 1112, the process marks the requested personal data to send to client and FIG. 11 processing thereafter returns to the calling routine (see FIG. 10) at 1114.

On the other hand, if the benefit does not meet the benefit threshold, then decision 1110 branches to the 'no' branch, whereupon the process determines whether to negotiate with client 345 to receive an acceptable benefit, for example, based upon parameters set by the user (decision 1115). If the process should not negotiate, decision 1115 branches to the "no" branch whereupon the process returns to the calling routine with a "request denied" at 1120.

On the other hand, if the process should negotiate with client 345, decision 1115 branches to the "yes" branch. At step 1125, the process generates a benefit increase proposal based on the benefit threshold from the security statement, and sends the benefit increase proposal to client 345. For example, the process may send a proposal that requests a 25% merchandise discount from client 345 in order for the process to provide client 345 with the user's location.

At step 1130, the process receives a response from client 345, and the process determines as to whether client 345 accepted the benefit increase proposal (decision 1135). If client 345 accepted the benefit increase proposal, then decision 1135 branches to the 'yes' branch, whereupon the process marks the requested personal data to send to client at step 1115. FIG. 11 processing thereafter returns to the calling routine (see FIG. 10) at 1120.

On the other hand, if client 345 does not accept the benefit increase proposal, then decision 1135 branches to the 'no' branch. At step 1140, the process generates a personal data subset proposal and sends the personal data subset proposal to client 345. For example, the client may offer a 20% merchandise discount if the user provides the user's birthdate, which is unacceptable to the user based on the security statements. However, the security statements indicate that the user is willing to provide the user's age for a 20% merchandise discount. In this example, the process generates a personal data subset proposal that offers to provide the user's age for the 20% merchandise discount.

At step 1145, the process receives a response from client 345 and the process determines as to whether client 345 accepted the personal data subset proposal (decision 1150). If client 345 accepted the proposal, then decision 1150 branches to the 'yes' branch, whereupon the process marks a subset of personal data to send to client 345 (step 1160). FIG. 11 processing thereafter returns to the calling routine (see FIG. 10) at 1165.

On the other hand, if client 345 did not accept the personal data subset proposal, then decision 1150 branches to the 'no' branch whereupon the process returns to the calling routine with a "request denied" at 1155.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

receiving, by the processor, a request from a client that requests personal data, wherein the request includes one or more benefits offered to a user in response to providing the personal data;

determining that the one or more benefits do not meet one or more benefit thresholds corresponding to one or more security statements, wherein at least one of the one or more security statements include at least one data type and at least one benefit type, and wherein at least one of the one or more security statements is based on a user response from the user responding to a different request from a different client;

in response to the determining, sending a proposal to the client selected from a group consisting of a benefit increase proposal and a personal data subset proposal;

receiving an agreement from the client corresponding to the proposal;

sending at least a subset of the personal data to the client in response to receiving the agreement from the client; and receiving at least a subset of the one or more benefits from client based on the agreement.

2. The method of claim 1 further comprising:
identifying an entity type of the client; and
selecting the one or more benefits based upon the entity type of the client.

3. The method of claim 1 wherein the one or more security statements corresponding to the requested personal data are stored in a natural language context, the method further comprising:
parsing a selected one of the one or more security statements into a plurality of sentence parts;
deriving one or more relationships between the plurality of sentence parts; and
determining the at least one data type and the at least one benefit type based upon the one or more relationships.

4. The method of claim 1 further comprising:
identifying a first one of the one or more security statements that allows the personal data to be sent to the client;
identifying a second one of the one or more security statements that prohibits the personal data to be sent to the client; and
preventing the sending of the personal data to the client based upon the second security statement.

5. The method of claim 1 further comprising:
wherein the benefit increase proposal indicates an increase in benefit relative to the offered one or more benefits.

6. The method of claim 1 further comprising:
wherein the personal data subset proposal identifies a subset of the requested personal data to provide to the client.

7. The method of claim 1 further comprising:
notifying the user of the subset of the one or more benefits and the at least subset of the personal data sent to the client.

8. The method of claim 1 wherein the requested personal data includes a request for a user location, the method further comprising:
providing the user location to the client, wherein at least one of the one or more benefits are based upon the user location.

9. The method in claim 1 wherein the client is selected from the group consisting of a mobile application, a social media site, and an application executing on an operating system.

10. The method of claim 1 further comprising:
sending a message to the client that denies the request in response to the determination indicating that the one or more benefits do not meet one or more benefit thresholds.

11. An information handling system comprising:
one or more processors;
a memory coupled to at least one of the processors; and
a set of computer program instructions stored in the memory and executed by at least one of the processors in order to perform actions of:
receiving, by the processor, a request from a client that requests personal data, wherein the request includes one or more benefits offered to a user in response to providing the personal data;
determining that the one or more benefits do not meet one or more benefit thresholds corresponding to one or more security statements, wherein at least one of the one or more security statements include at least one data type and at least one benefit type, and wherein at least one of the one or more security statements is based on a user response from the user responding to a different request from a different client;
in response to the determining, sending a proposal to the client selected from a group consisting of a benefit increase proposal and a personal data subset proposal;
receiving an agreement from the client corresponding to the proposal;
sending at least a subset of the personal data to the client in response to receiving the agreement from the client; and
receiving at least a subset of the one or more benefits from client based on the agreement.

12. The information handling system of claim 11 wherein the one or more processors perform additional actions comprising:
identifying an entity type of the client; and
selecting the one or more benefits based upon the entity type of the client.

13. The information handling system of claim 11 wherein the one or more security statements corresponding to the requested personal data are stored in a natural language context, and wherein the one or more processors perform additional actions comprising:
parsing a selected one of the one or more security statements into a plurality of sentence parts;
deriving one or more relationships between the plurality of sentence parts; and
determining the at least one data type and the at least one benefit type based upon the one or more relationships.

14. The information handling system of claim 11 wherein the one or more processors perform additional actions comprising:
identifying a first one of the one or more security statements that allows the personal data to be sent to the client;
identifying a second one of the one or more security statements that prohibits the personal data to be sent to the client; and
preventing the sending of the personal data to the client based upon the second security statement.

15. A computer program product stored in a non-transitory computer readable storage medium, comprising computer program code that, when executed by an information handling system, causes the information handling system to perform actions comprising:

receiving, by the processor, a request from a client that requests personal data, wherein the request includes one or more benefits offered to a user in response to providing the personal data;

determining that the one or more benefits do not meet one or more benefit thresholds corresponding to one or more security statements, wherein at least one of the one or more security statements include at least one data type and at least one benefit type, and wherein at least one of the one or more security statements is based on a user response from the user responding to a different request from a different client;

in response to the determining, sending a proposal to the client selected from a group consisting of a benefit increase proposal and a personal data subset proposal;

receiving an agreement from the client corresponding to the proposal;

sending at least a subset of the personal data to the client in response to receiving the agreement from the client; and receiving at least a subset of the one or more benefits from client based on the agreement.

16. The computer program product of claim 15 wherein the information handling system performs additional actions comprising:

identifying an entity type of the client; and selecting the one or more benefits based upon the entity type of the client.

17. The computer program product of claim 15 wherein the one or more security statements corresponding to the requested personal data are stored in a natural language context, and wherein the information handling system performs additional actions comprising:

parsing a selected one of the one or more security statements into a plurality of sentence parts;

deriving one or more relationships between the plurality of sentence parts; and determining the at least one data type and the at least one benefit type based upon the one or more relationships.

18. program product of claim 15 wherein the information handling system performs additional actions comprising:

identifying a first one of the one or more security statements that allows the personal data to be sent to the client;

identifying a second one of the one or more security statements that prohibits the personal data to be sent to the client; and preventing the sending of the personal data to the client based upon the second security statement.

\* \* \* \* \*